US009097406B2

(12) United States Patent
Zhang

(10) Patent No.: US 9,097,406 B2
(45) Date of Patent: Aug. 4, 2015

(54) BURGLARPROOF LAMP

(75) Inventor: Sumin Zhang, Shenzhen (CN)

(73) Assignee: CE LIGHTING LTD., Shenzhen (CN)

( * ) Notice: Subject to any disclaimer, the term of this patent is extended or adjusted under 35 U.S.C. 154(b) by 0 days.

(21) Appl. No.: 14/127,809

(22) PCT Filed: Mar. 22, 2012

(86) PCT No.: PCT/CN2012/072862
§ 371 (c)(1), (2), (4) Date: Dec. 26, 2013

(87) PCT Pub. No.: WO2012/174909
PCT Pub. Date: Dec. 27, 2012

(65) Prior Publication Data
US 2014/0133140 A1 May 15, 2014

(30) Foreign Application Priority Data
Jun. 21, 2011 (CN) .......................... 2011 1 0167245

(51) Int. Cl.
*A01K 9/00* (2006.01)
*F21V 15/00* (2015.01)
*H01K 1/46* (2006.01)
*H01R 33/97* (2006.01)
*F21V 19/00* (2006.01)
*F21K 99/00* (2010.01)
*F21Y 101/02* (2006.01)

(52) U.S. Cl.
CPC ............ *F21V 15/005* (2013.01); *F21K 9/1355* (2013.01); *F21K 9/1375* (2013.01); *F21V 19/002* (2013.01); *F21V 19/006* (2013.01); *F21V 19/008* (2013.01); *H01K 1/465* (2013.01); *H01R 33/971* (2013.01); *F21K 9/135* (2013.01); *F21Y 2101/02* (2013.01)

(58) Field of Classification Search
CPC .......... H01R 33/22; H01R 33/09; H01K 1/46; F21V 2101/02; F21V 23/06; F21V 19/0005; F21S 48/211; F21K 9/00
USPC ......................................... 362/650, 652, 655
See application file for complete search history.

(56) References Cited

U.S. PATENT DOCUMENTS 6,016,596 A 1/2000 Rodgers
2006/0126345 A1 6/2006 Chen

FOREIGN PATENT DOCUMENTS

CN 1790834 A 6/2006
CN 2888697 Y 4/2007

(Continued)

OTHER PUBLICATIONS

International Search Report mailed Jul. 5, 2012 for the corresponding PCT Application No. PCT/CN2012/072862.

(Continued)

*Primary Examiner* — Jong-Suk (James) Lee
*Assistant Examiner* — Mark Tsidulko
(74) *Attorney, Agent, or Firm* — Leason Ellis LLP.

(57) ABSTRACT

A burglarproof lamp includes a lamp head part with a lamp head shell, a center contact bolt, a center contact insulation fixing base, a center contact insulation fixing sheet, a location post and a connection part fixing base. The center contact bolt is connected to a conductive pole after passing through the center contact insulation fixing base, the lamp head shell and the center contact insulation fixing sheet. The connection part fixing base has a boss and a containing cavity where a spring and a center conductive shaft are located. A conductive fixing ring is connected to the lamp head shell for limiting the position of the connection part fixing base via the boss. The center contact insulation fixing sheet has a location hole, into which the location post can be inserted when it is driven to the position corresponding to the location hole by the connection part fixing base.

14 Claims, 4 Drawing Sheets

(56) References Cited

FOREIGN PATENT DOCUMENTS

| | | | |
|---|---|---|---|
| CN | 101363607 | A | 2/2009 |
| CN | 100580313 | A | 1/2010 |
| CN | 201416752 | Y | 3/2010 |
| CN | 102252193 | A | 11/2011 |
| CN | 202101030 | U | 1/2012 |

OTHER PUBLICATIONS

International Preliminary Report mailed Dec. 23, 2013 for the corresponding PCT Application No. PCT/CN2012/072862.

BURGLARPROOF LAMP

CROSS-REFERENCE TO RELATED PATENT APPLICATIONS

This application is a U.S. National Phase Application under 35 U.S.C. §371 of International Patent Application No. PCT/CN2012/072862, filed Mar. 22, 2012, and claims the benefit of Chinese Patent Application No. 201110167245.X, filed on Jun. 21, 2011, all of which are incorporated by reference in their entirety herein. The International Application was published in Chinese on Dec. 27, 2012 as International Publication No. WO/2012/174909 under PCT Article 21(2).

FIELD OF THE INVENTION

The present invention relates to an burglarproof lamp.

BACKGROUND OF THE INVENTION

E27 screw bulbs and B22 bayonet bulbs are commonly used for lamps and lanterns. Stealing of bulbs in public places impacts public lighting but is hard to prevent as such bulbs can be easily removed by bare hands without any special means. Thus, an anti-theft feature is required, especially for those of higher value like LED bulbs.

SUMMARY OF THE INVENTION

The present invention intends to overcome deficiencies of the prior art to provide an burglarproof lamp looking the same as an ordinary lamp with an ingenious structure that is easy to use but harder to remove.

The present invention adopts the following technical solutions. The invention comprises a lamp holder part and a light emitting part. The burglarproof lamp further comprises a base, via which the lamp holder part and the light emitting part are connected, and two power lines. The lamp holder part comprises a lamp holder shell, a center contact screw, a center contact insulation fixing base, a center contact insulation fixing sheet, a conductive post, a center conductive shaft, a spring, at least one positioning post, a connection part fixing base, a conductive clamping ring, and a conductive fixing ring. The center contact bolt successively passes through the center contact insulation fixing base, the lamp holder shell and the center contact insulation fixing sheet to get fixedly connected with the conductive post for electric conduction. A containing cavity where the spring and the center conductive shaft are successively located and a boss are provided in the lower part of the connection part fixing base. The positioning post is embedded in the bottom of the connection part fixing base. At least one positioning hole adapted to the positioning post in size and position is provided on the center contact insulation fixing sheet. The connection part fixing base together with the positioning post, the spring and the center conductive shaft are placed above the center contact insulation fixing sheet within the lamp holder shell. The conductive clamping ring is sleeved on the outer wall of the connection part fixing base. The conductive fixing ring is sleeved on the connection part fixing base and fixedly connected with the lamp holder shell for electric conduction and limiting the connection part fixing base axially via the boss. The conductive clamping ring is conductive in contact with the lamp holder shell. The center conductive shaft is conductive in contact with the conductive post. The connection part fixing base is able to drive the positioning post to rotate between the lamp holder shell and the conductive fixing ring and move axially. The connection part fixing base is able to set a circumferential limit with the center contact insulation fixing sheet by inserting the positioning post into the positioning hole when the positioning post rotates to a position corresponding to the positioning hole. The two power lines are conductively connected with the conductive clamping ring and the center conductive shaft respectively.

The base and the connection part fixing base are fixedly connected via screws.

The conductive fixing ring and the lamp holder shell are fixed together by riveting.

A hole and a groove for a power line to penetrate are respectively provided in the center and the side wall of the connection part fixing base.

The burglarproof lamp is a fluorescent lamp and the light emitting part comprises a fluorescent tube.

Alternatively, the burglarproof lamp is an incandescent lamp and the light emitting part comprises a bulb shell and a tungsten wire, the base and the bulb shell being connected by bonding.

Alternatively, the burglarproof lamp is a LED lamp and the light emitting part comprises a bulb shell, a LED and a control circuit thereof, the base and the bulb shell being connected by bonding.

The burglarproof lamp has an E26, E27, E14, E12 or B22 lamp holder.

The present invention has advantageous effects as below in virtue of the present invention comprising a lamp holder part, a light emitting part, a base via which the lamp holder part and the light emitting part are connected, and two power lines, the lamp holder part comprising a lamp holder shell, a center contact screw, a center contact insulation fixing base, a center contact insulation fixing sheet, a conductive post, a center conductive shaft, a spring, at least one positioning post, a connection part fixing base, a conductive clamping ring, and a conductive fixing ring, the center contact bolt successively passing through the center contact insulation fixing base, the lamp holder shell and the center contact insulation fixing sheet to get fixedly connected with the conductive post for electric conduction, a containing cavity where the spring and the center conductive shaft are successively located and a boss being provided in the lower part of the connection part fixing base, the positioning post being embedded in the bottom of the connection part fixing base, at least one positioning hole adapted to the positioning post in size and position being provided on the center contact insulation fixing sheet, the connection part fixing base together with the positioning post, the spring and the center conductive shaft being placed above the center contact insulation fixing sheet within the lamp holder shell, the conductive clamping ring being sleeved on the outer wall of the connection part fixing base, the conductive fixing ring being sleeved on the connection part fixing base and fixedly connected with the lamp holder shell for electric conduction and limiting the connection part fixing base axially via the boss, the conductive clamping ring being conductive in contact with the lamp holder shell, the center conductive shaft being conductive in contact with the conductive post, the connection part fixing base being able to drive the positioning post to rotate between the lamp holder shell and the conductive fixing ring and move axially, the connection part fixing base being able to set a circumferential limit with the center contact insulation fixing sheet by inserting the positioning post into the positioning hole when the positioning post rotates to a position corresponding to the positioning hole, and the two power lines being conductively connected with the conductive clamping ring and the center conductive shaft respectively.

As shown in FIG. 3, when no external force is applied, the connection part fixing base along with the positioning post are bounced up under the force of the spring, so the positioning post gets separated from the positioning hole and the connection part fixing base gets to rotate freely, that is to say, in a natural state, the light emitting part and the lamp holder part are free to rotate relative to each other in a way equivalent to being separated, making it impossible to mount or demount the burglarproof lamp as the lamp holder part would not rotate no matter how the light emitting part is rotated. Only when an external force is applied via the light emitting part to press down and rotate the base together with the connection part fixing base till the positioning post reaches a position corresponding to the positioning hole, the positioning post can be inserted into the positioning hole as shown in FIG. 4, and at this time the light emitting part must remain depressed and rotated in order to drive, via the limiting function of the positioning post and the positioning hole, the center contact insulation fixing sheet and the lamp holder part to rotate with the light emitting part so as to mount or demount the burglarproof lamp. Since the present invention looks the same as an ordinary lamp, it would not get readily removed by a regular person, thus avoiding being stolen. Besides, freehand mounting and demounting without any auxiliary tools facilitates the use of this invention. Thereby, the present invention discloses an burglarproof lamp looking the same as an ordinary lamp with an ingenious structure that is easy to use but harder to remove.

DETAILED DESCRIPTION OF THE INVENTION

Preferred Embodiment

Figure 1:
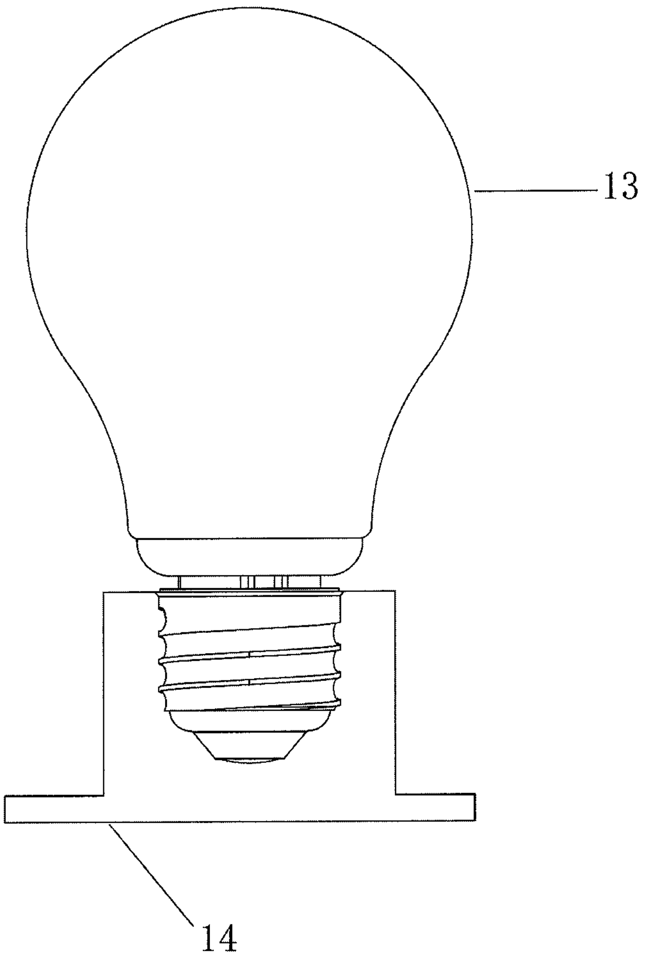
FIG. 1 is a structure diagram of a fully-assembled embodiment of this invention.
Figure 2:
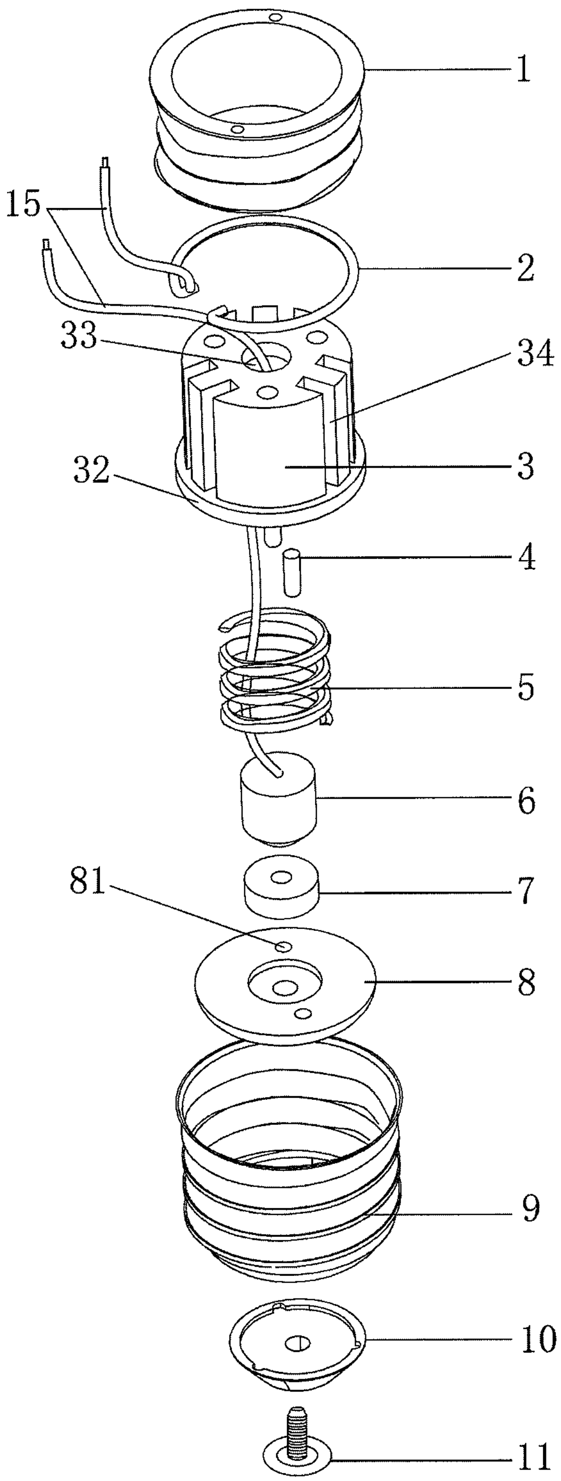
FIG. 2 is an exploded diagram of the embodiment.

As FIGS. 1 to 5 show, an burglarproof lamp implementing the present invention comprises a lamp holder part and a light emitting part including a bulb shell 13, a LED and a control circuit thereof, in other words, this embodiment is a LED lamp looking the same as an ordinary lamp in the prior art with a E27 lamp holder mounted on an ordinary lamp base 14. The burglarproof lamp further comprises a base 12, via which the lamp holder part and the light emitting part are connected, and two power lines 15, the lamp holder part comprising a lamp holder shell 9, a center contact screw 11, a center contact insulation fixing base 10, a center contact insulation fixing sheet 8, a conductive post 7, a center conductive shaft 6, a spring 5, two positioning posts 4, a connection part fixing base 3, a conductive clamping ring 2, and a conductive fixing ring 1, the center contact bolt 11 successively passing through the center contact insulation fixing base 10, the lamp holder shell 9 and the center contact insulation fixing sheet 8 to get fixedly connected with the conductive post 7 for electric conduction, wherein the center contact bolt 11 functioning as a solder point on the top of an ordinary lamp holder, i.e., an electrode, and the lamp holder shell 9 functioning as the other electrode in the same way as an ordinary lamp holder shell are externally and internally insulated from each other by the center contact insulation fixing base 10 and the center contact insulation fixing sheet 8 respectively, a containing cavity 31 where the spring 5 and the center conductive shaft 6 are successively located and a boss 32 being provided in the lower part of the connection part fixing base 3, wherein the center conductive shaft 6 may slide axially inside the containing cavity 31 by the action of the spring 5, the positioning posts 4 being embedded in the bottom of the connection part fixing base 3, two positioning holes 81 adapted to the positioning posts 4 in size and position being provided on the center contact insulation fixing sheet 8, the connection part fixing base 3 together with the positioning posts 4, the spring 5 and the center conductive shaft 6 being placed above the center contact insulation fixing sheet 8 within the lamp holder shell 9, the conductive clamping ring 2 being sleeved on the outer wall of the connection part fixing base 3, the conductive fixing ring 1 being sleeved on the connection part fixing base 3 and fixedly connected with the lamp holder shell 9 for electric conduction and limiting the connection part fixing base 3 axially via the boss 32, the conductive clamping ring 2 being conductive in contact with the lamp holder shell 9, the center conductive shaft 6 being conductive in contact with the conductive post 7, the connection part fixing base 3 being able to drive the positioning posts 4 to freely rotate between the lamp holder shell 9 and the conductive fixing ring 1 and move axially within a small range, the conductive post 7 having an outer diameter smaller than the inner diameter of the containing cavity 31 so that the conductive post 7 may move axially within the containing cavity 31, the connection part fixing base 3 being able to set a circumferential limit with the center contact insulation fixing sheet 8 by inserting the positioning posts 4 into the positioning holes 81 when the positioning posts 4 rotate to positions corresponding to the positioning holes 81, the two power lines 15 being conductively connected to the conductive clamping ring 2 and the center conductive shaft 6 respectively at one end and being connected to a circuit of the light emitting part respectively at the other end, a hole 33 and a groove 34 for a power line 15 to penetrate being respectively provided in the center and the side wall of the connection part fixing base 3, the base 12 and the connection part fixing base 3 being fixedly connected via screws 16, the base 12 and the bulb shell 13 being connected by bonding, the conductive fixing ring 1 being adapted to the lamp holder shell 9 in shape and size as both are threaded, and the conductive fixing ring 1 and the lamp holder shell 9 being connected via a screw thread before being fixed together by riveting via a rivet head.

Figure 3:
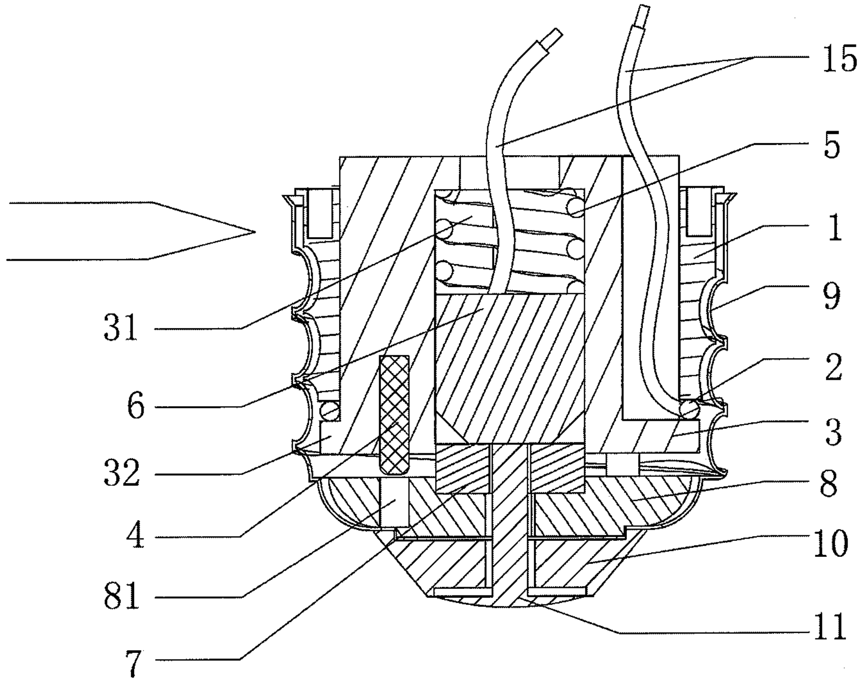
FIG. 3 is a cross-section diagram of the lamp holder part of the embodiment.
Figure 4:
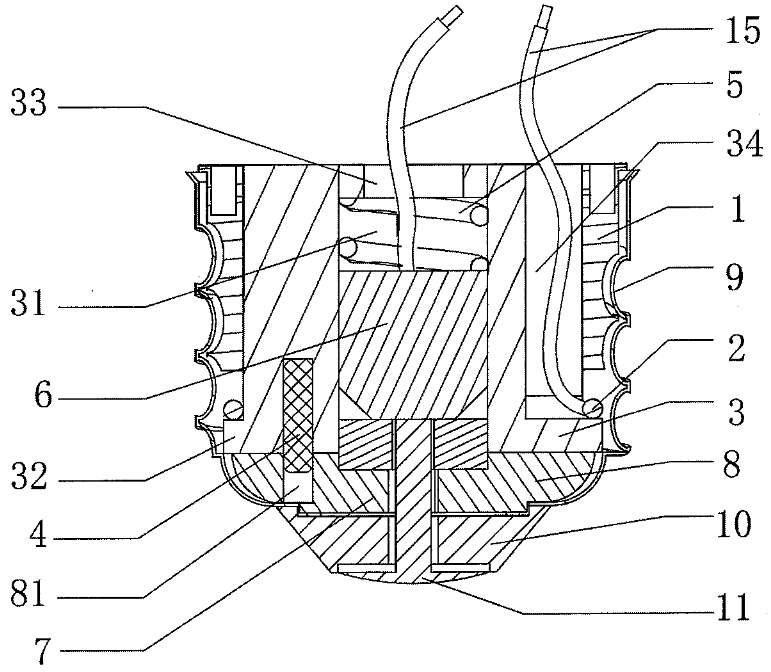
FIG. 4 is a cross-section diagram of the lamp holder part of the embodiment with a depressed connection part fixing base.
Figure 5:
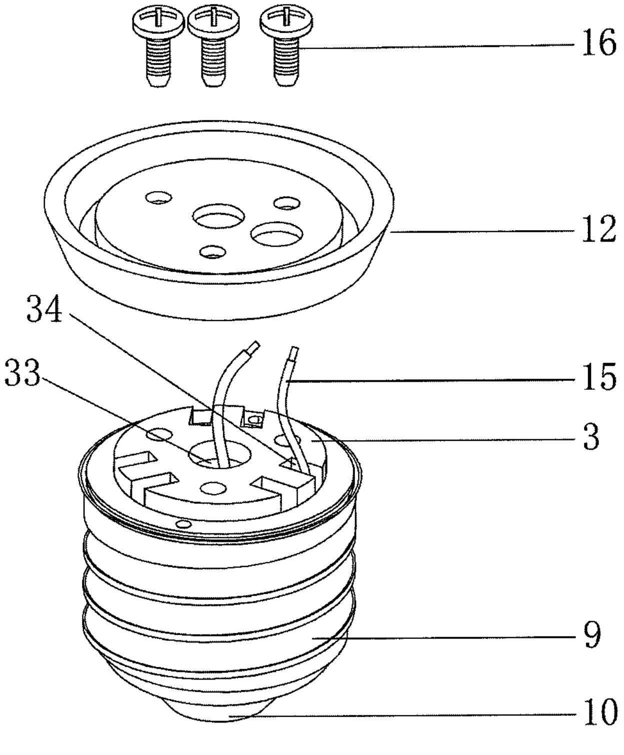
FIG. 5 is a diagram of connection between the lamp holder part and the base of the embodiment.

As shown in FIG. 3, when no external force is applied, the connection part fixing base 3 along with the positioning post 4 are bounced up under the force of the spring 5, so the positioning post 4 gets separated from the positioning hole 81 and the connection part fixing base 3 gets to rotate freely, that is to say, in a natural state, the light emitting part and the lamp holder part are free to rotate relative to each other in a way equivalent to being separated, making it impossible to mount or demount the burglarproof lamp as the lamp holder part would not rotate no matter how the light emitting part is rotated. Only when an external force is applied via the light emitting part to press down and rotate the base 12 together with the connection part fixing base 3 till the positioning post 4 reaches a position corresponding to the positioning hole 81, the positioning post 4 can be inserted into the positioning hole 81 as shown in FIG. 4, and at this time the light emitting part must remain depressed and rotated in order to drive, via the limiting function of the positioning post 4 and the positioning hole 81, the center contact insulation fixing sheet 8 and the lamp holder part to rotate with the light emitting part so as to mount or demount the burglarproof lamp. Since the present invention looks the same as an ordinary lamp, it would not get readily removed by a regular person, thus avoiding being stolen. Besides, freehand mounting and demounting without any auxiliary tools facilitates the use of this invention. Thereby, the present invention discloses an burglarproof lamp looking the same as an ordinary lamp with an ingenious structure that is easy to use but harder to remove.

As it should be, the burglarproof lamp may be an incandescent lamp with a light emitting part comprising a bulb shell 13 and a tungsten wire, and alternatively the burglarproof lamp may be a fluorescent lamp with a light emitting part comprising a fluorescent tube instead of a bulb shell. In addition, there may be at least one positioning post 4, and the burglarproof lamp may have an E26, E14 or E12 screw lamp holder, or a B22 bayonet lamp holder.

The present invention can be widely used in the lighting field.

The invention claimed is:

1. A burglarproof lamp comprising:

a lamp holder part;

a light emitting part;

a base via which the lamp holder part and the light emitting part are connected; and two power lines, wherein the lamp holder part comprises a lamp holder shell, a center contact screw, a center contact insulation fixing base, a center contact insulation fixing sheet, a conductive post, a center conductive shaft, a spring, at least one positioning post, a connection part fixing base, a conductive clamping ring, and a conductive fixing ring, the center contact bolt successively passes through the center contact insulation fixing base, the lamp holder shell and the center contact insulation fixing sheet so as to be fixedly connected with the conductive post for electric conduction, a containing cavity where the spring and the center conductive shaft are successively located and a boss are provided in the lower part of the connection part fixing base, the positioning post is embedded in the bottom of the connection part fixing base, at least one positioning hole adapted to the positioning post in size and position is provided on the center contact insulation fixing sheet, the connection part fixing base together with the positioning post, the spring and the center conductive shaft are placed above the center contact insulation fixing sheet within the lamp holder shell, the conductive clamping ring is sleeved on the outer wall of the connection part fixing base, the conductive fixing ring is sleeved on the connection part fixing base and fixedly connected with the lamp holder shell for electric conduction and limiting the connection part fixing base axially via the boss, the conductive clamping ring is in conductive contact with the lamp holder shell, the center conductive shaft is in conductive contact with the conductive post, the connection part fixing base is able to drive the positioning post to rotate between the lamp holder shell and the conductive fixing ring and move axially, the connection part fixing base is able to set a circumferential limit with the center contact insulation fixing sheet by inserting the positioning post into the positioning hole-when the positioning post rotates to a position corresponding to the positioning hole and the two power lines are conductively connected with the conductive clamping ring and the center conductive shaft respectively.

2. The burglarproof lamp according to claim 1, wherein the base and the connection part fixing base are fixedly connected via screws.

3. The burglarproof lamp according to claim 2, wherein the burglarproof lamp has an E26 (threaded, about 17.07-19.05 mm high and about 26.56 mm in diameter) E27 (threaded, about 22 mm high and about 26.1 mm in diameter), E14 (threaded, about 16 mm high and about 13.6 mm in diameter), E12 (threaded, and about 11.17 mm high and about 12.32 mm in diameter) or B22 (bayonet 22, about mm high and about 22.15 mm in diameter) lamp holder.

4. The burglarproof lamp according to claim 1, wherein the conductive fixing ring and the lamp holder shell are fixed together by riveting.

5. The burglarproof lamp according to claim 4, wherein the burglarproof lamp has an E26 (threaded, about 17.07-19.05 mm high and about 26.56 mm in diameter) E27 (threaded, about 22 mm high and about 26.1 mm in diameter), E14 (threaded, about 16 mm high and about 13.6 mm in diameter), E12 (threaded, and about 11.17 mm high and about 12.32 mm in diameter) or B22 (bayonet 22, about mm high and about 22.15 mm in diameter) lamp holder.

6. The burglarproof lamp according to claim 1, wherein a hole and a groove for a power line to penetrate are respectively provided in the center and the side wall of the connection part fixing base.

7. The burglarproof lamp according to claim 6, wherein the burglarproof lamp has an (threaded, about 17.07-19.05 mm high and about 26.56 mm in diameter) E27 (threaded, about 22 mm high and about 26.1 mm in diameter), E14 (threaded, about 16 mm high and about 13.6 mm in diameter), E12 (threaded, and about 11.17 mm high and about 12.32 mm in diameter) or B22 (bayonet 22, about mm high and about 22.15 mm in diameter) lamp holder.

8. The burglarproof lamp according to claim 1, wherein the burglarproof lamp is a fluorescent lamp and the light emitting part comprises a fluorescent tube.

9. The burglarproof lamp according to claim 8, wherein the burglarproof lamp has an E26 (threaded, about 17.07-19.05 mm high and about 26.56 mm in diameter) E27 (threaded, about 22 mm high and about 26.1 mm in diameter), E14 (threaded, about 16 mm high and about 13.6 mm in diameter), E12 (threaded, and about 11.17 mm high and about 12.32 mm in diameter) or B22 (bayonet 22, about mm high and about 22.15 mm in diameter) lamp holder.

10. The burglarproof lamp according to claim 1, wherein the burglarproof lamp is an incandescent lamp and the light emitting part comprises a bulb shell and a tungsten wire, the base and the bulb shell being connected by bonding.

11. The burglarproof lamp according to claim 10, wherein the burglarproof lamp has an E26 (threaded, about 17.07-19.05 mm high and about 26.56 mm in diameter) E27 (threaded, about 22 mm high and about 26.1 mm in diameter), E14 (threaded, about 16 mm high and about 13.6 mm in diameter), E12 (threaded, and about 11.17 mm high and about 12.32 mm in diameter) or B22 (bayonet 22, about mm high and about 22.15 mm in diameter) lamp holder.

12. The burglarproof lamp according to claim 1, wherein the burglarproof lamp is a LED lamp and the light emitting part comprises a bulb shell, a LED and a control circuit thereof, the base and the bulb shell being connected by bonding.

13. The burglarproof lamp according to claim 12, wherein the burglarproof lamp has an E26 (threaded, about 17.07-19.05 mm high and about 26.56 mm in diameter) E27 (threaded, about 22 mm high and about 26.1 mm in diameter), E14 (threaded, about 16 mm high and about 13.6 mm in diameter), E12 (threaded, and about 11.17 mm high and about 12.32 mm in diameter) or B22 (bayonet 22, about mm high and about 22.15 mm in diameter) lamp holder.

14. The burglarproof lamp according to claim 1, wherein the burglarproof lamp has an E26 (threaded, about 17.07-19.05 mm high and about 26.56 mm in diameter) E27 (threaded, about 22 mm high and about 26.1 mm in diameter), E14 (threaded, about 16 mm high and about 13.6 mm in diameter), E12 (threaded, and about 11.17 mm high and about 12.32 mm in diameter) or B22 (bayonet 22, about mm high and about 22.15 mm in diameter) lamp holder.

* * * * *